(12) United States Patent
Norfolk et al.

(10) Patent No.: US 11,941,568 B2
(45) Date of Patent: Mar. 26, 2024

(54) METHOD FOR QUALITY MONITORING OF ADDITIVE MANUFACTURING PROCESSES

(71) Applicant: Fabrisonic LLC, Columbus, OH (US)

(72) Inventors: Mark I. Norfolk, Powell, OH (US); Adam J. Hehr, Columbus, OH (US)

( * ) Notice: Subject to any disclaimer, the term of this patent is extended or adjusted under 35 U.S.C. 154(b) by 249 days.

(21) Appl. No.: 17/679,833

(22) Filed: Feb. 24, 2022

(65) Prior Publication Data

US 2022/0288845 A1 Sep. 15, 2022

Related U.S. Application Data

(63) Continuation of application No. 16/702,947, filed on Dec. 4, 2019, now abandoned.

(51) Int. Cl.
*B22F 10/30* (2021.01)
*B22F 10/80* (2021.01)
(Continued)

(52) U.S. Cl.
CPC ....... *G06Q 10/06395* (2013.01); *B22F 10/85* (2021.01); *B22F 12/90* (2021.01); *B29C 64/194* (2017.08); *G06F 11/3089* (2013.01); *G06Q 50/04* (2013.01); *B22F 5/007* (2013.01); *B22F 10/25* (2021.01); *B22F 10/28* (2021.01); *B22F 12/30* (2021.01); *B29C 33/3842* (2013.01); *B29C 2033/385* (2013.01); *B33Y 10/00* (2014.12); *B33Y 30/00* (2014.12);
(Continued)

(58) Field of Classification Search
CPC .......... B22F 5/007; B22F 10/25; B22F 10/28; B22F 10/30; B22F 10/80; B22F 10/85; B22F 12/30; B22F 12/90; B23K 20/10; B29C 33/3842; B29C 2033/385; B29C 33/72; B29C 64/147; B29C 64/245; B29C 64/35; B29C 64/386; B29C 64/393; B29C 65/08; B33Y 10/00; B33Y 50/00; B33Y 50/02; G01B 11/16; G01K 7/04; G01L 1/22; G01P 15/00; G05B 19/4099; G05B 2219/49015
USPC ........ 264/39, 40.1, 219, 406, 409; 156/73.1, 156/308.2; 73/514.01, 781, 862.381; 228/110.1; 338/5; 356/32; 374/179; 700/119

See application file for complete search history.

(56) References Cited

U.S. PATENT DOCUMENTS

| | | | |
|---|---|---|---|
| 2007/0040702 A1* | 2/2007 | Mosher | B29C 64/135 340/943 |
| 2012/0189729 A1* | 7/2012 | Pax | B29C 64/118 425/378.1 |
| 2015/0231798 A1* | 8/2015 | Goto | B29C 64/35 264/39 X |

* cited by examiner

*Primary Examiner* — Leo B Tentoni (57) ABSTRACT

A method for quality control monitoring of additive manufacturing processes comprising forming at least one channel in an additive manufacturing build platform, wherein the channel is formed in the upper surface of the build platform to a predetermined depth, and wherein the channel is formed in a predetermined pattern across the upper surface of the build platform; placing a sensor in the channel formed in the upper surface of the build platform, wherein the sensor gathers information relevant to an additive manufacturing process occurring on or in close proximity to the build platform; enclosing the sensor within the channel formed in the upper surface of the build platform with an additive manufacturing substrate, wherein components or parts are built directly on the substrate using an additive manufacturing process, and using the sensor to gather information about the components or parts and the additive manufacturing process itself.

20 Claims, 5 Drawing Sheets

(51) Int. Cl.
*B22F 10/85* (2021.01)
*B22F 12/90* (2021.01)
*B23K 20/10* (2006.01)
*B29C 33/72* (2006.01)
*B29C 64/147* (2017.01)
*B29C 64/194* (2017.01)
*B29C 64/245* (2017.01)
*B29C 64/35* (2017.01)
*B29C 64/386* (2017.01)
*B29C 64/393* (2017.01)
*B29C 65/08* (2006.01)
*B33Y 50/02* (2015.01)
*G01B 11/16* (2006.01)
*G01K 7/04* (2006.01)
*G01L 1/22* (2006.01)
*G01P 15/00* (2006.01)
*G05B 19/4099* (2006.01)
*G06F 11/30* (2006.01)
*G06Q 10/0639* (2023.01)
*G06Q 50/04* (2012.01)
*B22F 5/00* (2006.01)
*B22F 10/25* (2021.01)
*B22F 10/28* (2021.01)
*B22F 12/30* (2021.01)
*B29C 33/38* (2006.01)
*B33Y 10/00* (2015.01)
*B33Y 30/00* (2015.01)
*B33Y 50/00* (2015.01)
*B33Y 80/00* (2015.01)

(52) U.S. Cl.
CPC ............... *B33Y 50/00* (2014.12); *B33Y 80/00* (2014.12); *G05B 2219/49015* (2013.01)

METHOD FOR QUALITY MONITORING OF ADDITIVE MANUFACTURING PROCESSES

CROSS-REFERENCE TO RELATED APPLICATIONS

This patent application is a continuation of U.S. Non-Provisional application Ser. No. 16/702,947 filed on Dec. 4, 2019 and entitled "Systems and Devices for Quality Monitoring of Additive Manufacturing Processes," which has been abandoned, which claims the benefit of U.S. Provisional Patent Application Ser. No. 62/841,454 filed on May 1, 2019 and entitled "Embedded Sensing System for Quality Monitoring of Additive Manufacturing Processes," the disclosures of which are hereby incorporated by reference herein in its entirety and made part of the present U.S. utility patent application for all purposes.

BACKGROUND

The described systems and devices relate in general to quality control and quality assurance systems, devices, and methods for use in analyzing manufacturing processes and more specifically to systems and devices that utilize embedded sensors or sensor arrays for monitoring the quality of additive manufacturing processes and the quality of parts and components made by such processes.

Additive manufacturing (AM) has rapidly evolved into a valuable and desirable technique for making various components or parts which, at times, are difficult or even impossible to fabricate with conventional machining methods. Despite the demonstrated utility of AM, obtaining real-time feedback and data regarding an active fabrication process and the quality of the part or parts being made by that process has proven to be challenging. Obtaining such data is particularly important considering the relatively long periods of time required to construct complex parts. Hidden or obscured flaws occurring in an AM created part, which can be caused by excessive residual stresses, can result in the final part being unusable, thereby wasting valuable time, resources, and AM machine life. Accordingly, there is a need for a system and device for monitoring, in real-time, the quality of additive manufacturing processes and the parts and components made by such processes.

SUMMARY

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

One implementation of the disclosed technology provides a first method for quality control monitoring of additive manufacturing processes, comprising forming at least one channel in an additive manufacturing build platform having an upper surface and a lower surface, wherein the channel is formed in the upper surface of the additive manufacturing build platform; wherein the at least one channel is formed to a predetermined depth in the upper surface of the additive manufacturing build platform, and wherein the at least one channel is formed in a predetermined pattern across the upper surface of the additive manufacturing build platform; placing a sensor in the at least one channel formed in the upper surface of the additive manufacturing build platform, wherein the sensor is operative to gather information relevant to an additive manufacturing process occurring on or in close proximity to the additive manufacturing build platform; enclosing the sensor within the at least one channel formed in the upper surface of the additive manufacturing build platform with an additive manufacturing substrate having a predetermined thickness, wherein components or parts are built directly on the additive manufacturing substrate using an additive manufacturing process, and using the enclosed sensor to gather information about the components or parts and the additive manufacturing process used to build the components or parts.

The method may further comprise connecting a computer or data processor to the sensor, wherein the computer or data processor further includes software for analyzing data collected by the sensor. The method may further comprise forming the additive manufacturing substrate by depositing successive layers of metal on the upper surface of the additive manufacturing build platform. The method may further comprise using an ultrasonic additive manufacturing process to deposit the successive layers of metal on the upper surface of the additive manufacturing build platform. The method may further comprise using aluminum, stainless steel, nickel alloy, or combinations thereof for the additive manufacturing build platform. The method may further comprise removing a predetermined amount of material from the additive manufacturing substrate prior to the use thereof in an additive manufacturing process. The sensor may be an optical sensor. The sensor may also be a thermocouple; a strain gauge; a microphone; an accelerometer; an ultrasonic non-destructive evaluation sensor; or a magnetic sensor. The additive manufacturing build platform, sensor, and additive manufacturing substrate may be configured for either single use or multiple uses. The method may further comprise mounting the additive manufacturing build platform, sensor, and additive manufacturing substrate directly within an additive manufacturing system. The method may further comprise placing at least one additional sensor near the additive manufacturing system, wherein the at least one additional sensor is a thermal camera, an optical camera, or a three-dimensional laser scanner.

Another implementation of the disclosed technology provides a second method for quality control monitoring of additive manufacturing processes, comprising forming a plurality of channels in an additive manufacturing build platform having an upper surface and a lower surface, wherein each channel is formed in the upper surface of the additive manufacturing build platform; wherein each channel is formed to a predetermined depth in the upper surface of the additive manufacturing build platform, and wherein each channel is formed in a predetermined pattern across the upper surface of the additive manufacturing build platform; placing a sensor in each channel formed in the upper surface of the additive manufacturing build platform, wherein each sensor is operative to gather information relevant to an additive manufacturing process occurring on or in close proximity to the additive manufacturing build platform; enclosing each sensor within each channel formed in the upper surface of the additive manufacturing build platform with an additive manufacturing substrate having a predetermined thickness, wherein the additive manufacturing substrate is formed by depositing successive layers of metal on the upper surface of the additive manufacturing build platform using an ultrasonic additive manufacturing process, and wherein components or parts are built directly on the additive manufacturing substrate using an additive manufacturing process, and using the enclosed sensor to gather information about the components or parts and the additive manufacturing process used to build the components or parts.

The method may further comprise connecting a computer or data processor to the sensor, wherein the computer or data processor further includes software for analyzing data collected by the sensor. The method may further comprise removing a predetermined amount of material from the additive manufacturing substrate prior to the use thereof in an additive manufacturing process. The sensors may be optical sensors, thermocouples; strain gauges; microphones; accelerometers; ultrasonic non-destructive evaluation sensors; magnetic sensors, or combinations thereof. The additive manufacturing build platform, sensor, and additive manufacturing substrate may be configured for either single use or multiple uses. The method may further comprise mounting the additive manufacturing build platform, sensor, and additive manufacturing substrate directly within an additive manufacturing system. The channels may overlap one another or intersect with one another.

Still another implementation of the disclosed technology provides a third method for quality control monitoring of additive manufacturing processes, comprising forming a plurality of channels in an additive manufacturing build platform having an upper surface and a lower surface, wherein each channel is formed in the upper surface of the additive manufacturing build platform; wherein each channel is formed to a predetermined depth in the upper surface of the additive manufacturing build platform, and wherein each channel is formed in a predetermined pattern across the upper surface of the additive manufacturing build platform; placing a sensor in each channel formed in the upper surface of the additive manufacturing build platform, wherein each sensor is operative to gather information relevant to an additive manufacturing process occurring on or in close proximity to the additive manufacturing build platform; enclosing each sensor within each channel formed in the upper surface of the additive manufacturing build platform with an additive manufacturing substrate having a predetermined thickness, wherein the additive manufacturing substrate is formed by depositing successive layers of metal on the upper surface of the additive manufacturing build platform using an ultrasonic additive manufacturing process, and wherein components or parts are built directly on the additive manufacturing substrate using an additive manufacturing process, and using the enclosed sensor to gather information about the components or parts and the additive manufacturing process used to build the components or parts; mounting the additive manufacturing build platform, sensor, and additive manufacturing substrate directly within an additive manufacturing system; and connecting a computer or data processor to the sensor, wherein the computer or data processor further includes software for analyzing data collected by the sensor. The method may further comprise placing at least one additional sensor near the additive manufacturing system, wherein the at least one additional sensor is a thermal camera, an optical camera, or a three-dimensional laser scanner.

It should be appreciated that all combinations of the foregoing concepts and additional concepts discussed in greater detail below (provided such concepts are not mutually inconsistent) are contemplated as being part of the inventive subject matter disclosed herein and may be implemented to achieve the benefits as described herein. Additional features and aspects of the disclosed system, devices, and methods will become apparent to those of ordinary skill in the art upon reading and understanding the following detailed description of the example embodiments. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Various implementations provide relatively low-cost systems and devices for monitoring, in real-time, the quality of additive manufacturing processes and the different parts or components made by such processes. The sensing devices disclosed herein, also provide process and control capabilities that are compatible with multiple metal additive manufacturing (AM) platforms to enable standardization across different platforms. Example implementations of the disclosed sensing devices include multiple integrated sensors; reduce overhead production costs; enhance production repeatability; reduce fulfillment cycle times; and enable a flexible supply chain with part qualification data. The disclosed systems and devices also provide standardized process control technology that enables a flexible, affordable, and fast response AM supply chain.

As described herein, certain example implementations of the disclosed sensing devices are typically constructed using a combination of ultrasonic additive manufacturing and subtractive machining. As described below, a cover may be formed by depositing successive layers of metal on an upper surface of the sensing device. The successive layers of metal may be deposited in some implementations using an ultrasonic additive manufacturing (UAM) process. Because UAM is a solid-state process, metal can be welded over a sensor or sensor array without damaging embedded sensors. After an adequate amount of protective metal has been printed over the sensor or sensor array, the metal surface of the cover is milled flat and the sensing device is placed in a traditional additive manufacturing machine as the build platform. Traditional additive manufacturing is then performed to create a specific part or component. During the additive manufacturing printing process, one or more embedded sensors are used to measure various states and conditions of the build platform, including temperature, strain, acceleration, and the like. Generated data is collected and processed using various computer hardware and software, and the overall quality of the manufactured component or part is determined by processing and analyzing this data.

One example of a disclosed sensing device includes at least one embedded fiber optic distributed strain sensor, which may be placed, oriented, or arranged in a variety of predetermined patterns, and a temperature sensor. Thus, the embedded sensors allow both strain and temperature to be resolved in any direction at any point over a large surface area. By way of non-limiting examples, the sensor or sensors may include optical sensors; optical fibers; and fiber optic sensors. The sensors may also include strain gauges; foil strain gauges; thermometers; thermocouples; microphones; accelerometers; ultrasonic non-destructive evaluation sensors; and magnetic sensors. As parts are fabricated using AM on the smart baseplate, real-time monitoring of residual strain occurs and indicates or reveals problem areas where part failure can occur. The collected data can also be used to qualify the part before being placed into service.

The sensing devices disclosed herein may be used to analyze various additive manufacturing processing, including by way of non-limiting examples: laser powder bed fusion (L-PBF); arc-DED (directed energy deposition) additive manufacturing; laser-DED additive manufacturing; electron beam-DED additive manufacturing; and various plastics-based processes. In various implementations, the internal route of the sensor fiber utilizes a unique curvilinear layout or configuration to capture three, two-dimensional strain states (or more) across the surface of the sensing device acting as a build platform. Sensor fibers are embedded close to the surface of printing to enhance sensitivity to surface strain events, e.g., delamination or cracking of L-PBF parts or components.

Figure 1:
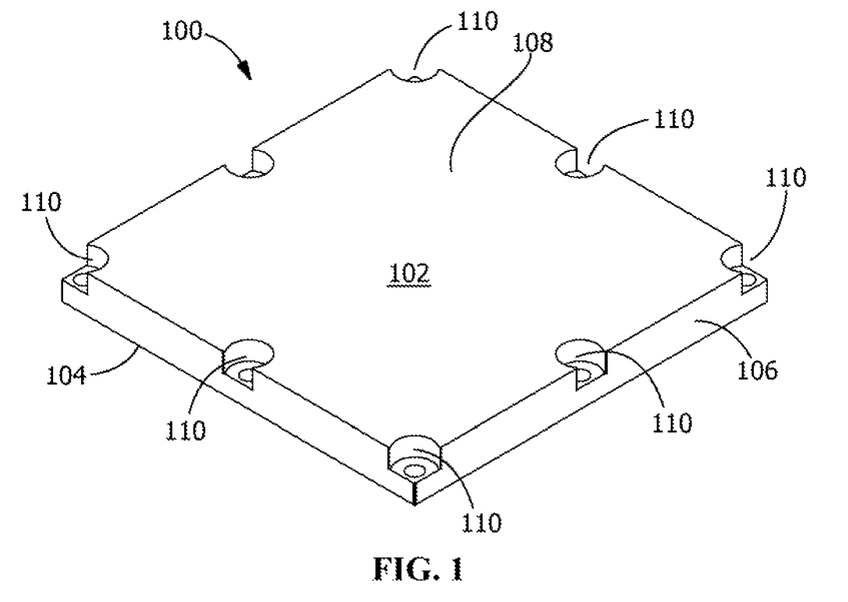
FIG. 1 provides a perspective view of an example metal build platform or substrate used for additive manufacturing builds, wherein the substrate is adapted to be mounted within an additive manufacturing system.

FIG. 1 depicts an example metal build platform used for additive manufacturing processes and builds, wherein the build platform is adapted to be mounted directly within an additive manufacturing system. In FIG. 1, build platform 100 includes substrate 102; which further includes bottom surface 104; middle portion 106; and upper surface 108. A plurality of apertures or bolt holes 110 are formed in substrate 102 for mounting build platform 100 within an additive manufacturing system or apparatus for use in creating parts or components by additive manufacturing.

Figure 2A:
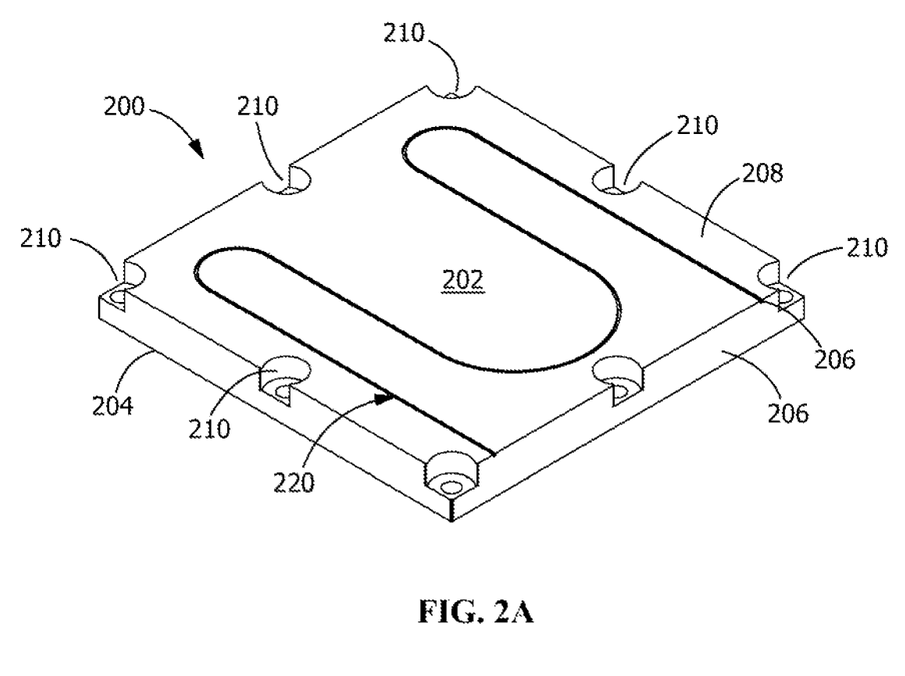
FIG. 2A depicts the example substrate of FIG. 1, wherein a single channel having a predetermined two-dimensional geometric shape has been milled into the substrate for receiving a sensor such as a fiber optic sensor.
Figure 2B:
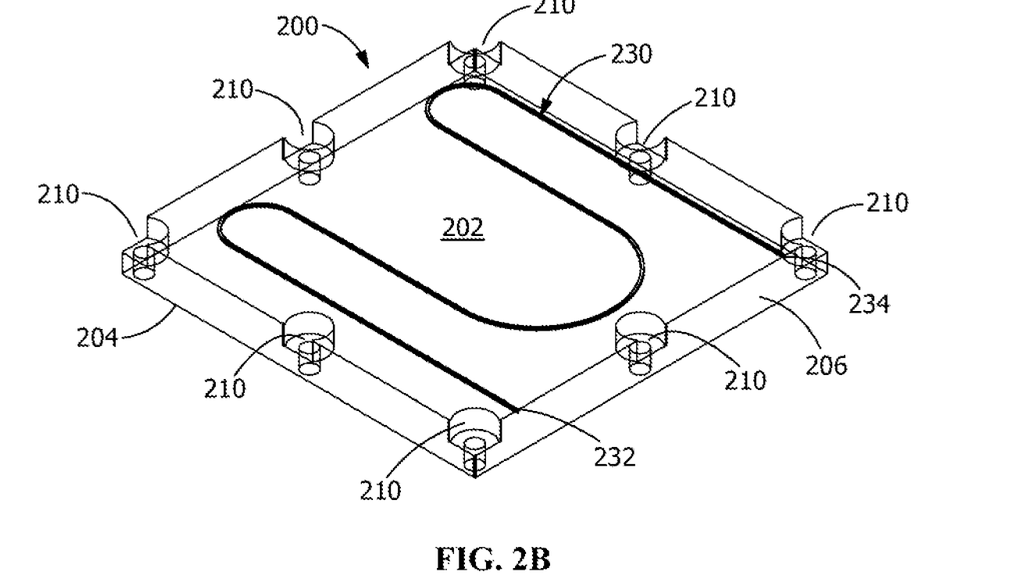
FIG. 2B depicts the example substrate of FIG. 2A, wherein a fiber optic sensor has been placed within the channel milled into the substrate.
Figure 2C:
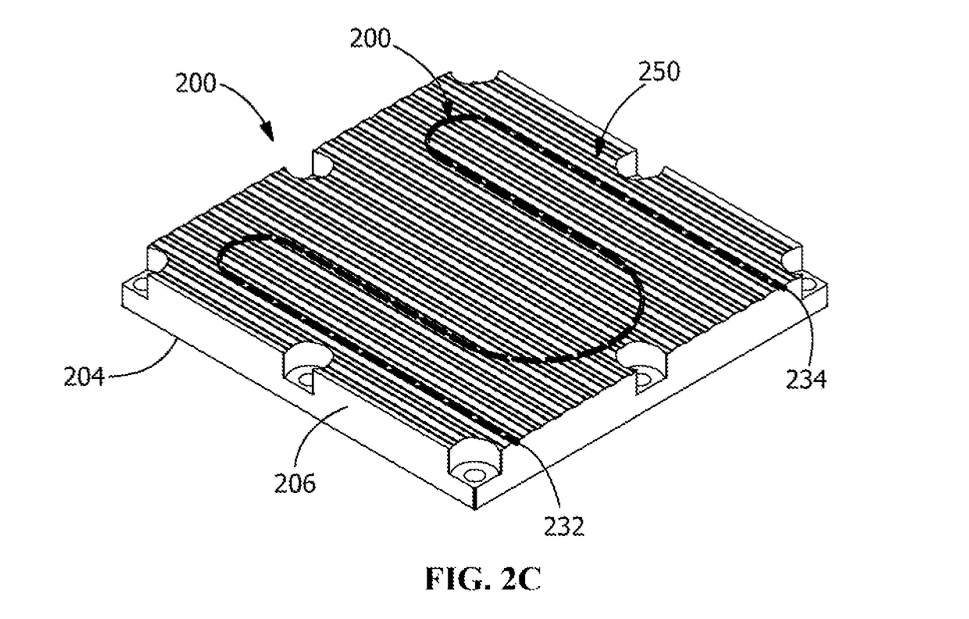
FIG. 2C depicts the example substrate of FIG. 2B, wherein one or more layers of metal have been deposited over the fiber optic sensor using an additive manufacturing process or other suitable technique to create a sensor plate or sensing device.

FIG. 2A depicts the example substrate of FIG. 1, wherein a single channel having a predetermined two-dimensional geometric shape has been milled into the substrate for receiving a sensor such as a fiber optic sensor. FIG. 2B depicts the example substrate of FIG. 2A, wherein a fiber optic sensor has been placed within the channel milled into the substrate; and FIG. 2C depicts the example substrate of FIG. 2B, wherein one or more layers of metal have been deposited over the fiber optic sensor using an additive manufacturing process or other suitable technique to create a sensor plate or sensing device, which may be referred to as a "smart baseplate". In FIGS. 2A-2C, sensing device 200 is essentially a modified build platform that includes substrate 202, which further includes bottom surface 204; middle portion 206; and upper surface 208. A plurality of apertures or bolt holes 210 are formed in substrate 202 for mounting sensing device 200 within an additive manufacturing system or apparatus for use in creating parts or components by additive manufacturing. As best shown in FIG. 2A, channel 220 is milled into upper surface 208 to a predetermined depth and in a predetermined pattern. In this and other implementations, the predetermined pattern may be changed or modified based on a specification application or use of sensing device 200. Accordingly, the curvilinear shape of channel 220 shown in FIG. 2A is a non-limiting example and many other shapes and geometries are possible. As best shown in FIG. 2A, sensor 230, which in this non-limiting example is a fiber optic sensor, is disposed within channel 220. Sensor 230 includes first connector 232 and second connector 234, which are used to connect the sensor to a computer or data processor that includes software for analyzing data collected by the sensor. As best shown in FIG. 2C, sensing device 200 includes cover 250, which is formed on upper surface 208 by depositing successive layers of metal thereon using, for example, an ultrasonic additive manufacturing process. Cover 250 may then be used as the substrate for various additive manufacturing processes, wherein components or parts are built directly on cover 250 while information about the components or parts and the additive manufacturing process used to build such items is gathered using sensing device 200.

Figure 3:
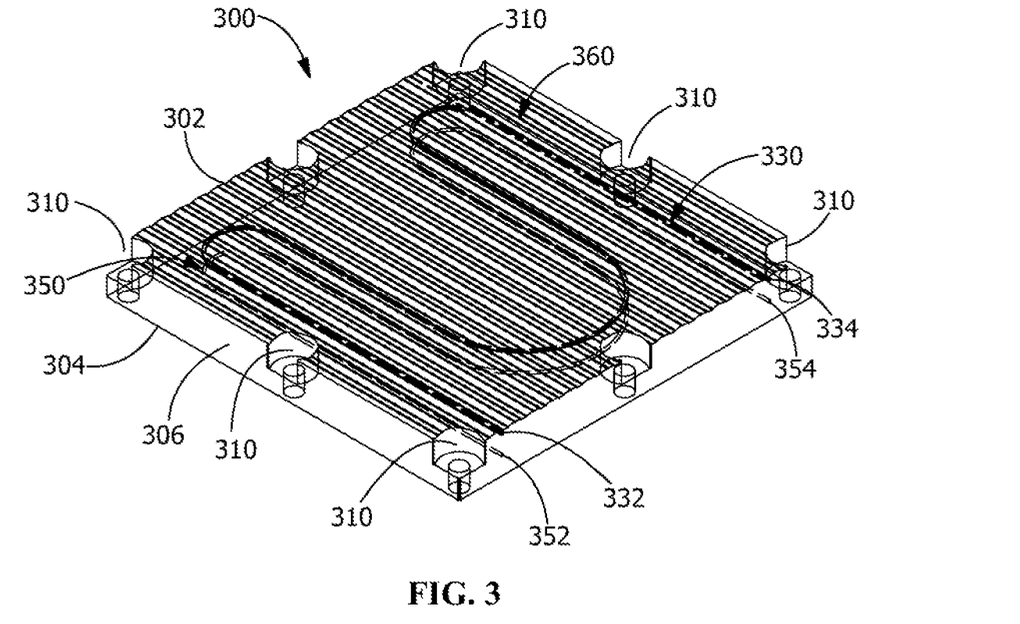
FIG. 3 provides a perspective view of another example sensor plate or sensing device that includes multiple fiber optic sensors mounted within the sensor plate or sensing device in multiple overlapping horizontal planes to create an array of sensors within the sensor plate or sensing device, wherein the sensors are positioned in the same orientation (i.e., substantially parallel) relative to one-another.

FIG. 3 depicts another example sensor plate or sensing device that includes multiple fiber optic sensors mounted within the sensing device in multiple overlapping horizontal planes to create an array of sensors within the sensing device, wherein the sensors are positioned in the same orientation (e.g., substantially parallel) relative to one-another. In FIG. 3, sensing device 300 is essentially a modified build platform that includes substrate 302, which further includes bottom surface 304; middle portion 306; and upper surface 308. A plurality of apertures or bolt holes 310 are formed in substrate 302 for mounting sensing device 300 within an additive manufacturing system or apparatus for use in creating parts or components by additive manufacturing. First channel 320 (not visible in FIG. 3) is milled into upper surface 308 to a predetermined depth and in a predetermined pattern. First sensor 330, which in this non-limiting example is a fiber optic sensor, is disposed within channel 320. First sensor 330 includes first connector 332 and second connector 334, which are used to connect the sensor to a computer or data processor that includes software for analyzing data collected by the sensor. Second channel 340 (not visible in FIG. 3) is milled into upper surface 308 to a predetermined depth and in a predetermined pattern. Second sensor 350, which in this non-limiting example is also fiber optic sensor, is disposed within channel 340. Second sensor 350 includes first connector 352 and second connector 354, which are used to connect the sensor to a computer or data processor that includes software for analyzing data collected by the sensor. In this and other implementations, the predetermined patterns may be changed or modified based on a specification application or use of sensing device 300. Accordingly, the curvilinear shape of channels 320 and 340 shown in FIG. 3 is a non-limiting example and many other shapes and geometries are possible. Sensing device 300 includes cover 360, which may be formed on upper surface 308 by depositing successive layers of metal thereon using, for example, an ultrasonic additive manufacturing process. Cover 360 may then be used as the substrate for various additive manufacturing processes, wherein components or parts are built directly on cover 360 while information about the components or parts and the additive manufacturing process used to build such items is gathered using sensing device 300.

Figure 4:
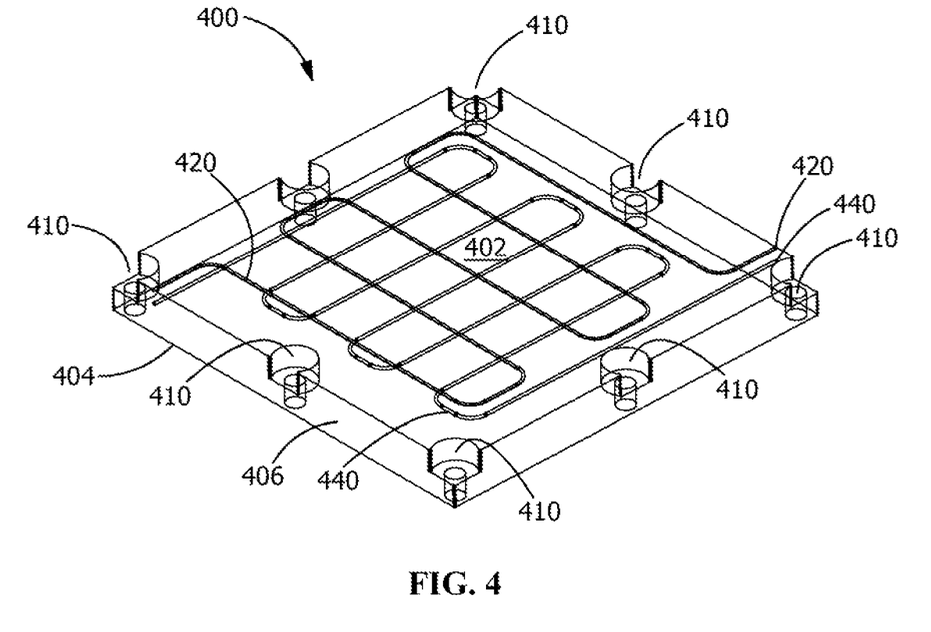
FIG. 4 provides a perspective view of another example sensor plate or sensing device that includes multiple fiber optic sensors mounted within the sensor plate or sensing device in multiple overlapping horizontal planes to create an array of sensors within the sensor plate or sensing device, wherein the sensors are positioned in a different orientation (i.e., substantially perpendicular) relative to one-another.

FIG. 4 depicts another example sensor plate or sensing device that includes multiple fiber optic sensors mounted within the sensing device in multiple overlapping horizontal planes to create an array of sensors within the sensing device, wherein the sensors are positioned in a different orientation (e.g., substantially perpendicular) relative to one-another. In FIG. 4, sensing device 400 is essentially a modified build platform that includes substrate 402, which further includes bottom surface 404; middle portion 406; and upper surface 408. A plurality of apertures or bolt holes 410 are formed in substrate 402 for mounting sensing device 400 within an additive manufacturing system or apparatus for use in creating parts or components by additive manufacturing. First channel 420 is milled into upper surface 408 to a predetermined depth and in a predetermined pattern. A fiber optic sensor may be disposed within first channel 420. Second channel 440 is milled into upper surface 408 to a predetermined depth and in a predetermined pattern, which is different than the pattern of first channel 420. A fiber optic sensor may be disposed within second channel 440. As shown in FIG. 4, the paths of channels 420 and 440 overlap, but are substantially perpendicular to one another. In this and other implementations, the predetermined patterns may be changed or modified based on a specification application or use of sensing device 400. Accordingly, the curvilinear shape of channels 420 and 440 shown in FIG. 4 is a non-limiting example and many other shapes and geometries are possible. Although not shown in FIG. 4, sensing device 400 typically includes a cover, which may be formed on upper surface 408 by depositing successive layers of metal thereon using, for example, an ultrasonic additive manufacturing process. The cover may then be used as the substrate for various additive manufacturing processes, wherein components or parts are built directly on the cover while information about the components or parts and the additive manufacturing process used to build such items is gathered using sensing device 400. With regard to this implementation, separating the two fibers sensors in the Z direction (Cartesian coordinate system) permits resolution of moments in addition to forces in the X-Y plane. Failure modes for build platforms commonly occur from a bending moment created by solidification stresses.

Figure 5:
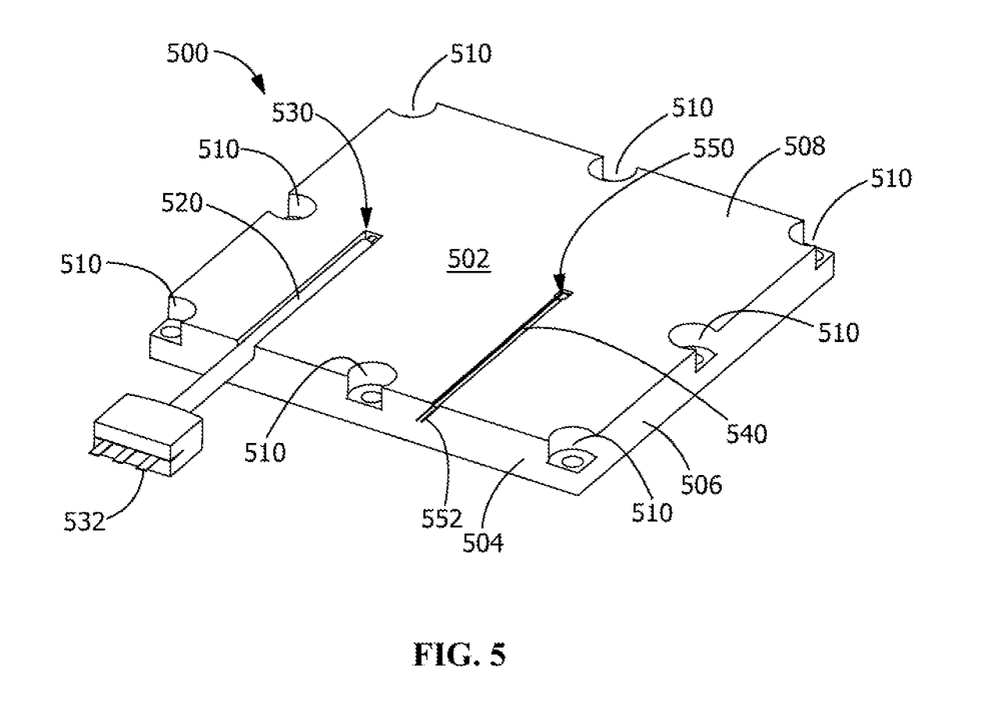
FIG. 5 provides a perspective view of another example sensor plate or sensing device (shown without a cover); wherein multiple channels have been milled into a substrate, wherein a thermocouple has positioned into one channel, and wherein a foil strain gauge has been positioned in the other channel.

FIG. 5 depicts another example sensor plate or sensing device (shown without a cover); wherein multiple channels have been milled into a substrate, wherein a thermocouple has positioned into one channel, and wherein a foil strain gauge has been positioned in the other channel. In FIG. 5, sensing device 500 is essentially a modified build platform that includes substrate 502, which further includes bottom surface 504; middle portion 506; and upper surface 508. A plurality of apertures or bolt holes 510 are formed in substrate 502 for mounting sensing device 500 within an additive manufacturing system or apparatus for use in creating parts or components by additive manufacturing. First channel 520 (not visible in FIG. 3) is milled into upper surface 508 to a predetermined depth and in a predetermined pattern, which in this example is linear. First sensor 530, which in this non-limiting example is a thermocouple, is disposed within channel 520. First sensor 530 includes connector 532, which is used to connect the sensor to a computer or data processor that includes software for analyzing data collected by the sensor. Second channel 540 is milled into upper surface 508 to a predetermined depth and in a predetermined pattern. Second sensor 550, which in this non-limiting example is a foil strain gauge, is disposed within channel 540. Second sensor 550 includes connectors 552, which are used to connect the sensor to a computer or data processor that includes software for analyzing data collected by the sensor. In this and other implementations, the predetermined patterns may be changed or modified based on a specification application or use of sensing device 500. Accordingly, the linear shape of channels 520 and 540 shown in FIG. 5 is a non-limiting example and many other shapes and geometries are possible. Although not shown in FIG. 5, sensing device 500 typically includes a cover, which may be formed on upper surface 508 by depositing successive layers of metal thereon using, for example, an ultrasonic additive manufacturing process. The cover may then be used as the substrate for various additive manufacturing processes, wherein components or parts are built directly on the cover while information about the components or parts and the additive manufacturing process used to build such items is gathered using sensing device 500.

Figure 6A:
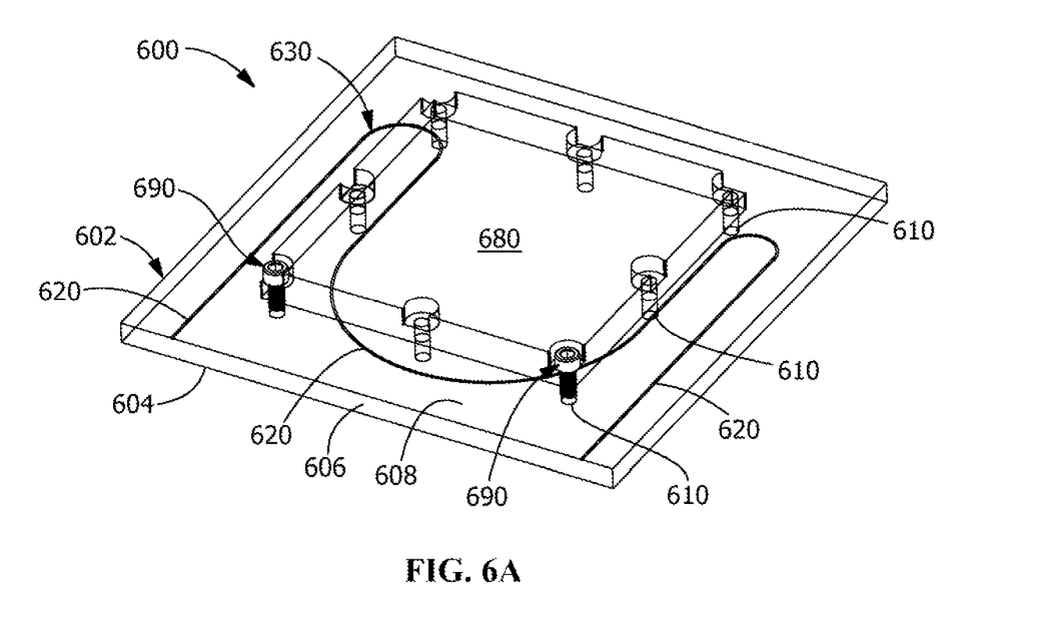
FIG. 6A provides a perspective view of another example sensor plate or sensing device, wherein the sensor plate or sensing device, which includes a fiber optic sensor has been adapted to receive a substrate or standard build plate on its upper surface to form an assembly.
Figure 6B:
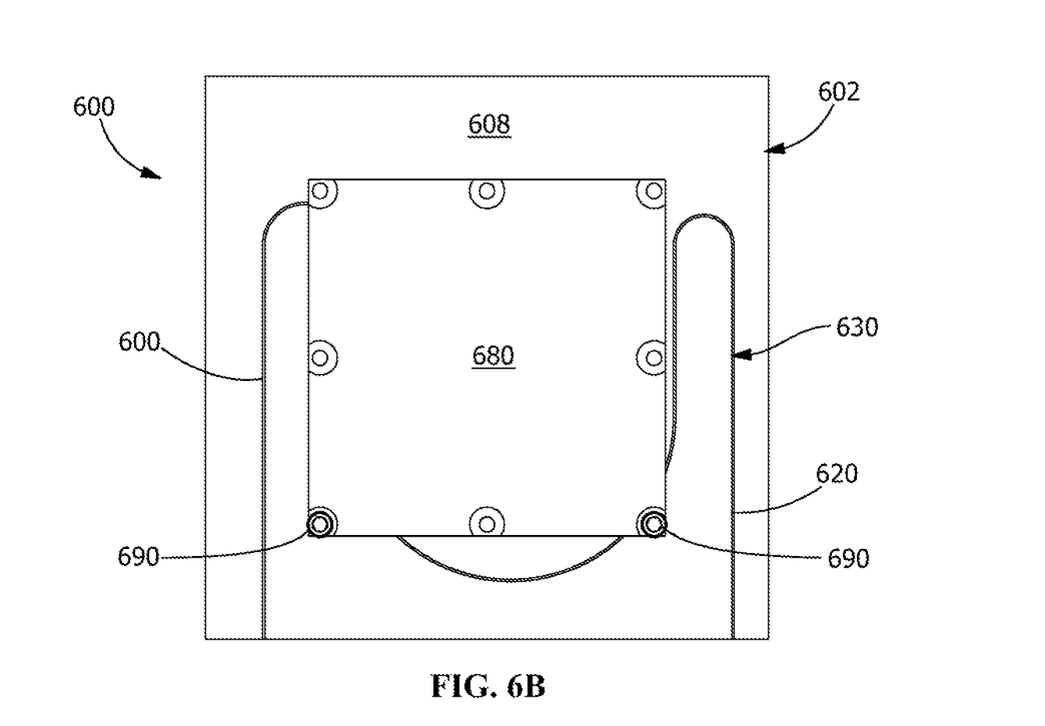
FIG. 6B is a top view of the assembly shown in FIG. 6A, wherein the substrate is positioned on top of the sensor plate or sensing device and wherein the fiber optic sensor is shown extending underneath a portion of the substrate for gathering data therefrom.

FIG. 6A depicts another example sensor plate or sensing device, wherein the sensing device, which includes a fiber optic sensor, has been adapted to receive a substrate or standard build platform on its upper surface to form an assembly. FIG. 6B is a top view of the assembly shown in FIG. 6A, wherein the substrate is positioned on top of the sensing device and wherein the fiber optic sensor is shown extending underneath a portion of the substrate for gathering data therefrom. In FIGS. 6A-6B, sensing system 600 includes sensing device 602 includes bottom surface 604; middle portion 606; and upper surface 608. A plurality of apertures or bolt holes 610 are formed in sensing device 602 for receiving bolts 690 or other attachment devices that connect build platform 680 to sensing device 602. Channel 620 is milled into upper surface 608 to a predetermined depth and in a predetermined pattern. In this and other implementations, the predetermined pattern may be changed or modified based on a specification application or use of sensing device 602. Accordingly, the curvilinear shape of channel 620 shown in FIGS. 6A-6B is a non-limiting example and many other shapes and geometries are possible. Sensor 630, which in this non-limiting example is a fiber optic sensor is disposed within channel 620. In this implementation, a cover may or may not be formed on upper surface 608; however, build platform 680 is mounted over at least a portion of sensor 630 and secured to upper surface 608 as previously described. Once fabricated and assembled, sensing system 600 may be placed within an additive manufacturing system or apparatus for normal use.

Some implementations of the disclosed systems and device include sensors that are physically separate from the sensors embedded in the substrate, but that still gather data relevant to the quality and characteristics of a part being manufactured on the substrate. By way of non-limiting examples, these additional sensors may include thermal cameras; optical cameras; three-dimensional laser scanners; or combinations thereof that are in electrical communication with a computer or data processor that is also in electrical communication with the embedded sensors.

Some implementations of the disclosed systems and devices include sensing devices that may be re-used, as opposed to being single-use disposable or consumable devices. In these implementations, a sensing device with a cover is created and then placed in an additive manufacturing system where a part or component is then built on sensing device acting as a build platform for the additive manufacturing process. Once the part or component is created, it is removed from the sensing device using electrical discharge machining (EDM) or another suitable process. A predetermined amount of material is then removed from the cover (for example, 0.010-0.050 inches) to clean and prepare the cover of the sensing device for use in creating another part or component using additive manufacturing. In this manner, with the cover being created to have a suitable predetermined height, sensing devices such as those disclosed herein may be used multiple times rather than just once.

The present invention is generally compatible with, generally related or applicable to, or generally relevant regarding the technologies described in the following patent references, all of which are incorporated-by-reference herein, in their entirety, for all purposes: U.S. Pat. Nos. 6,685,365; 6,443,352; 6,457,629; 6,463,349; 6,519,500; 8,082,966; 8,272,424; 9,346,120; and 9,446,475.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this specification are used to describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed inventive subject matter. Various functions and elements described herein may be partitioned differently from those shown without departing from the scope of the disclosed inventive subject matter. Generic principles defined herein may be applied to other implementations. Different numbers of a given module or unit may be employed, a different type or types of a given module or unit may be employed, a given module or unit may be added, or a given module or unit may be omitted.

It should be appreciated that all combinations of the foregoing concepts and additional concepts discussed in greater detail herein (provided such concepts are not mutually inconsistent) are contemplated as being part of the disclosed inventive subject matter. In particular, all combinations of claimed subject matter appearing at the end of this disclosure are contemplated as being part of the inventive subject matter disclosed herein. While the disclosed inventive subject matter has been illustrated by the description of example embodiments and example implementations thereof, and while the example embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A method for quality control monitoring of additive manufacturing processes, comprising:

(a) forming at least one channel in an additive manufacturing build platform having an upper surface and a lower surface,
  (i) wherein the channel is formed in the upper surface of the additive manufacturing build platform;
  (ii) wherein the at least one channel is formed to a predetermined depth in the upper surface of the additive manufacturing build platform, and
  (iii) wherein the at least one channel is formed in a curvilinear pattern across the upper surface of the additive manufacturing build platform;
(b) placing a sensor in the at least one channel formed in the upper surface of the additive manufacturing build platform, wherein the sensor is operative to gather information relevant to an additive manufacturing process occurring on the additive manufacturing build platform;
(c) enclosing the sensor within the at least one channel formed in the upper surface of the additive manufacturing build platform with an additive manufacturing substrate having a predetermined thickness,
  (i) wherein components or parts are built directly on the additive manufacturing substrate using an additive manufacturing process, and
(d) using the enclosed sensor to gather information about the components or parts and the additive manufacturing process used to build the components or parts.

2. The method of claim 1, further comprising connecting a computer or data processor to the sensor, wherein the computer or data processor further includes software for analyzing data collected by the sensor.

3. The method of claim 1, further comprising forming the additive manufacturing substrate by depositing successive layers of metal on the upper surface of the additive manufacturing build platform.

4. The method of claim 3, further comprising using an ultrasonic additive manufacturing process to deposit the successive layers of metal on the upper surface of the additive manufacturing build platform.

5. The method of claim 1, further comprising using aluminum, stainless steel, nickel alloy, or combinations thereof for the additive manufacturing build platform.

6. The method of claim 1, further comprising removing a predetermined amount of material from the additive manufacturing substrate prior to the use thereof in an additive manufacturing process.

7. The method of claim 1, wherein the sensor is an optical sensor.

8. The method of claim 1, wherein the sensor is a thermocouple; a strain gauge; a microphone; an accelerometer; an ultrasonic non-destructive evaluation sensor; or a magnetic sensor.

9. The method of claim 1, wherein the additive manufacturing build platform, sensor, and additive manufacturing substrate are configured for either single use or multiple uses.

10. The method of claim 1, further comprising mounting the additive manufacturing build platform, sensor, and additive manufacturing substrate directly within an additive manufacturing system.

11. The method of claim 10, further comprising placing at least one additional sensor near the additive manufacturing system, wherein the at least one additional sensor is a thermal camera, an optical camera, or a three-dimensional laser scanner.

12. A method for quality control monitoring of additive manufacturing processes, comprising:
(a) forming a plurality of channels in an additive manufacturing build platform having an upper surface and a lower surface,
  (i) wherein each channel is formed in the upper surface of the additive manufacturing build platform;
  (ii) wherein each channel is formed to a predetermined depth in the upper surface of the additive manufacturing build platform, and
  (iii) wherein each channel is formed in a curvilinear pattern across the upper surface of the additive manufacturing build platform;
(b) placing a sensor in each channel formed in the upper surface of the additive manufacturing build platform, wherein each sensor is operative to gather information relevant to an additive manufacturing process occurring on the additive manufacturing build platform;
(c) enclosing each sensor within each channel formed in the upper surface of the additive manufacturing build platform with an additive manufacturing substrate having a predetermined thickness,
  (i) wherein the additive manufacturing substrate is formed by depositing successive layers of metal on the upper surface of the additive manufacturing build platform using an ultrasonic additive manufacturing process, and
  (ii) wherein components or parts are built directly on the additive manufacturing substrate using an additive manufacturing process, and
(d) using the enclosed sensor to gather information about the components or parts and the additive manufacturing process used to build the components or parts.

13. The method of claim 12, further comprising connecting a computer or data processor to the sensor, wherein the computer or data processor further includes software for analyzing data collected by the sensor.

14. The method of claim 12, further comprising removing a predetermined amount of material from the additive manufacturing substrate prior to the use thereof in an additive manufacturing process.

15. The method of claim 12, wherein the sensors are optical sensors, thermocouples; strain gauges; microphones; accelerometers; ultrasonic non-destructive evaluation sensors; magnetic sensors, or combinations thereof.

16. The method of claim 12, wherein the additive manufacturing build platform, sensor, and additive manufacturing substrate are configured for either single use or multiple uses.

17. The method of claim 12, further comprising mounting the additive manufacturing build platform, sensor, and additive manufacturing substrate directly within an additive manufacturing system.

18. The method of claim 12, wherein the channels overlap one another or intersect with one another.

19. A method for quality control monitoring of additive manufacturing processes, comprising:
(a) forming a plurality of channels in an additive manufacturing build platform having an upper surface and a lower surface,
  (i) wherein each channel is formed in the upper surface of the additive manufacturing build platform;
  (ii) wherein each channel is formed to a predetermined depth in the upper surface of the additive manufacturing build platform, and
  (iii) wherein each channel is formed in a curvilinear pattern across the upper surface of the additive manufacturing build platform;

(b) placing a sensor in each channel formed in the upper surface of the additive manufacturing build platform, wherein each sensor is operative to gather information relevant to an additive manufacturing process occurring on the additive manufacturing build platform;
(c) enclosing each sensor within each channel formed in the upper surface of the additive manufacturing build platform with an additive manufacturing substrate having a predetermined thickness,
 (i) wherein the additive manufacturing substrate is formed by depositing successive layers of metal on the upper surface of the additive manufacturing build platform using an ultrasonic additive manufacturing process, and
 (ii) wherein components or parts are built directly on the additive manufacturing substrate using an additive manufacturing process, and
(d) using the enclosed sensor to gather information about the components or parts and the additive manufacturing process used to build the components or parts;
(e) mounting the additive manufacturing build platform, sensor, and additive manufacturing substrate directly within an additive manufacturing system; and
(f) connecting a computer or data processor to the sensor, wherein the computer or data processor further includes software for analyzing data collected by the sensor.

20. The method of claim 19, further comprising placing at least one additional sensor near the additive manufacturing system, wherein the at least one additional sensor is a thermal camera, an optical camera, or a three-dimensional laser scanner.

* * * * *